United States Patent
Yabe et al.

(10) Patent No.: US 11,485,293 B2
(45) Date of Patent: Nov. 1, 2022

(54) DUMP TRUCK

(71) Applicant: Komatsu Ltd., Tokyo (JP)

(72) Inventors: Yousuke Yabe, Tokyo (JP); Daichi Yui, Tokyo (JP)

(73) Assignee: Komatsu Ltd., Tokyo (JP)

( * ) Notice: Subject to any disclaimer, the term of this patent is extended or adjusted under 35 U.S.C. 154(b) by 266 days.

(21) Appl. No.: 16/645,086

(22) PCT Filed: Jul. 12, 2018

(86) PCT No.: PCT/JP2018/026312
§ 371 (c)(1),
(2) Date: Mar. 6, 2020

(87) PCT Pub. No.: WO2019/092922
PCT Pub. Date: May 16, 2019

(65) Prior Publication Data
US 2020/0282919 A1   Sep. 10, 2020

(30) Foreign Application Priority Data

Nov. 10, 2017   (JP) ............................. JP2017-217265

(51) Int. Cl.
*B60R 11/00* (2006.01)
*B60P 1/04* (2006.01)
(Continued)

(52) U.S. Cl.
CPC ................ *B60R 11/00* (2013.01); *B60P 1/04* (2013.01); *B60P 1/16* (2013.01);
(Continued)

(58) Field of Classification Search
CPC .................................. B60R 1/04; B60R 11/00
(Continued)

(56) References Cited

U.S. PATENT DOCUMENTS

| 9,442,194 B2 * | 9/2016 | Kurihara ............... G01S 13/931 |
| 2003/0039124 A1 * | 2/2003 | Tawa ....................... B60Q 1/10 |
| | | 362/464 |

(Continued)

FOREIGN PATENT DOCUMENTS

| CA | 2934879 A1 | 7/2015 |
| CN | 201059121 Y | 5/2008 |

(Continued)

OTHER PUBLICATIONS

PCT International Preliminary Report on Patentability and Written Opinion in International Application No. PCT/JP2018/026312, dated May 12, 2020, 5 pages.

(Continued)

*Primary Examiner* — D Glenn Dayoan
*Assistant Examiner* — Sunsurraye Westbrook
(74) *Attorney, Agent, or Firm* — Fish & Richardson P.C.

(57) ABSTRACT

A dump truck, which travels in travel directions and dumps loads in a dumping direction collinear to one of the travel directions, includes: a chassis provided with tires at front and rear parts in the travel direction; an obstacle detector provided at a dump-side end of the chassis, the obstacle detector detecting an obstacle in the dumping direction of the chassis; and a shifter that is capable of moving the obstacle detector to a first position at which the obstacle detector protrudes beyond dump-side ends of the tires and to a second position at which the obstacle detector is located inner than the dump-side ends of the tires.

14 Claims, 16 Drawing Sheets

(51) Int. Cl.
  *G01S 13/931*  (2020.01)
  *B60P 1/16*  (2006.01)
  *G01S 13/86*  (2006.01)

(52) U.S. Cl.
  CPC . *B60R 2011/004* (2013.01); *B60R 2011/0092* (2013.01); *G01S 13/865* (2013.01); *G01S 13/931* (2013.01); *G01S 2013/9327* (2020.01)

(58) Field of Classification Search
  USPC .......................................... 298/17 r; 180/169
  See application file for complete search history.

(56) References Cited

U.S. PATENT DOCUMENTS

| | | | |
|---|---|---|---|
| 2013/0141581 A1 | 6/2013 | Mitsuta et al. | |
| 2013/0236280 A1* | 9/2013 | Yui | B60R 3/002 414/685 |
| 2014/0104049 A1 | 4/2014 | Foss et al. | |
| 2014/0266859 A1 | 9/2014 | Kurihara et al. | |
| 2014/0375503 A1 | 12/2014 | Kurihara et al. | |
| 2015/0077281 A1 | 3/2015 | Taniguchi et al. | |
| 2015/0210213 A1 | 7/2015 | Mitsuta et al. | |
| 2015/0326829 A1* | 11/2015 | Kurihara | G01S 13/931 348/148 |
| 2015/0355333 A1* | 12/2015 | Ono | G01S 7/4972 356/4.01 |
| 2016/0236616 A1 | 8/2016 | Kurihara et al. | |
| 2017/0298595 A1 | 10/2017 | Machida et al. | |

FOREIGN PATENT DOCUMENTS

| | | |
|---|---|---|
| CN | 201121061 Y | 9/2008 |
| CN | 201861155 U | 6/2011 |
| CN | 103098112 A | 5/2013 |
| CN | 203142918 | 8/2013 |
| CN | 103415783 | 11/2013 |
| CN | 103430044 | 12/2013 |
| CN | 103608216 A | 2/2014 |
| CN | 203567648 | 4/2014 |
| CN | 103988239 | 8/2014 |
| CN | 105283777 A | 1/2016 |
| CN | 205022566 | 2/2016 |
| CN | 105531996 | 4/2016 |
| CN | 105722570 | 6/2016 |
| CN | 105849662 A | 8/2016 |
| CN | 206520700 | 9/2017 |
| EP | 3136341 A1 | 3/2017 |
| JP | 2014-61822 | 4/2014 |
| JP | 2014-221641 | 11/2014 |
| JP | 2015-230551 | 12/2015 |
| JP | 2016-78724 | 5/2016 |
| WO | 2013136566 A1 | 9/2013 |

OTHER PUBLICATIONS

Office Action in Chinese Appln. No. 201880060836.7, dated Aug. 11, 2021, 16 pages (with English translation).
PCT International Search Report in International Appln. No. PCT/JP2018/026312, dated Sep. 11, 2018, 1 page.
Li et al., "Obstacle Detection and Reverse Monitoring Device of Mining Dump Truck," Coal-mine safety, Feb. 2013, 44(2):111-112 (with English Abstract).
Office Action in Chinese Appln. No. 201880060836.7, dated Mar. 17, 2022, 13 pages (with English translation).
Ruff, "Evaluation of a radar-based proximity warning system for off-highway dump trucks," Accident Analysis & Prevention, Jan. 2006, 38(1):92-98.
Stentz et al., "A robotic excavator for autonomous truck loading," Proceedings of the 1998 IEEE/RSJ Intl. Conference on Intelligent Robots and Systems, Oct. 1998, 9 pages.

* cited by examiner

FIG.6
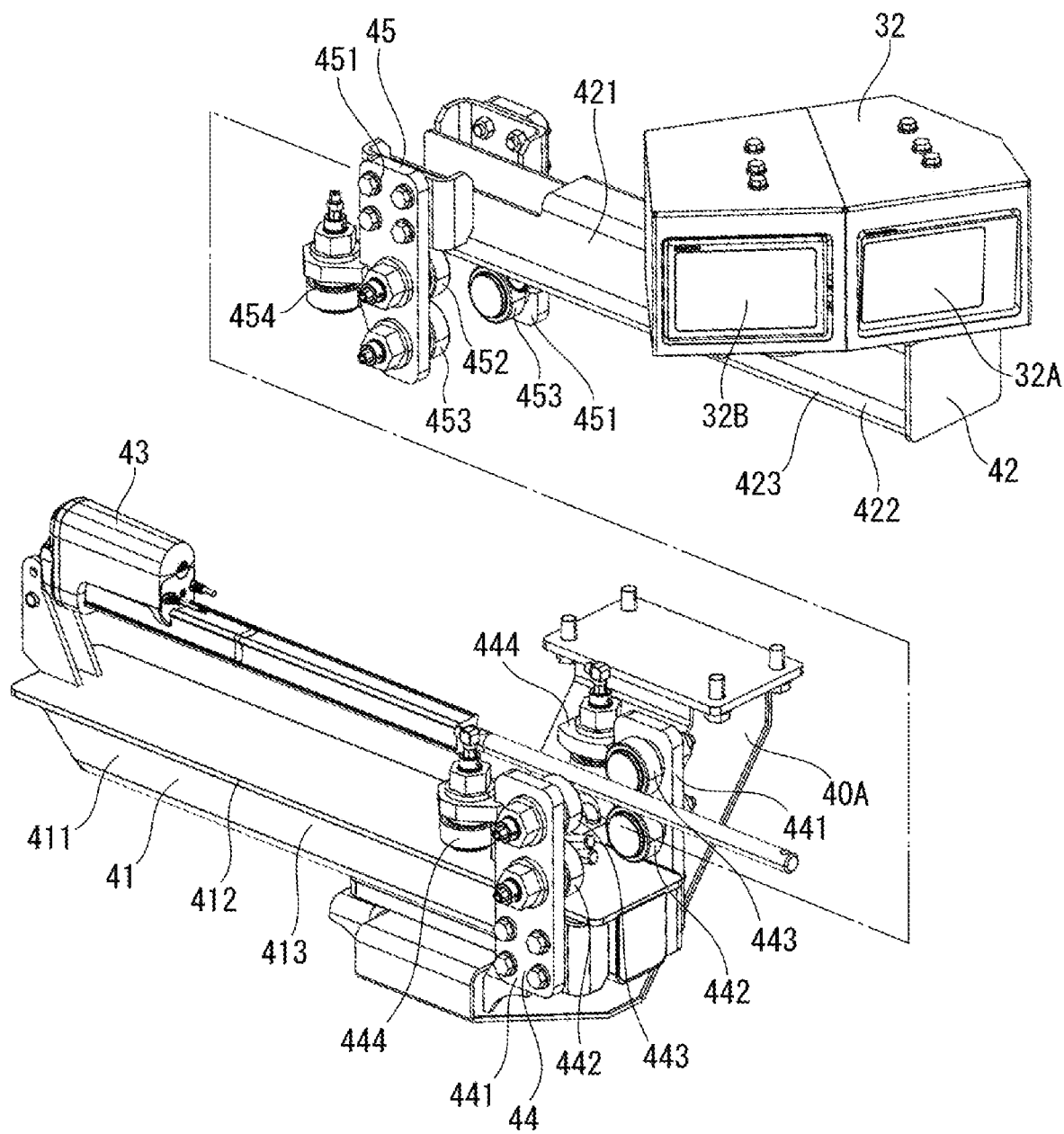
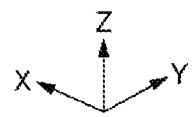

FIG.12
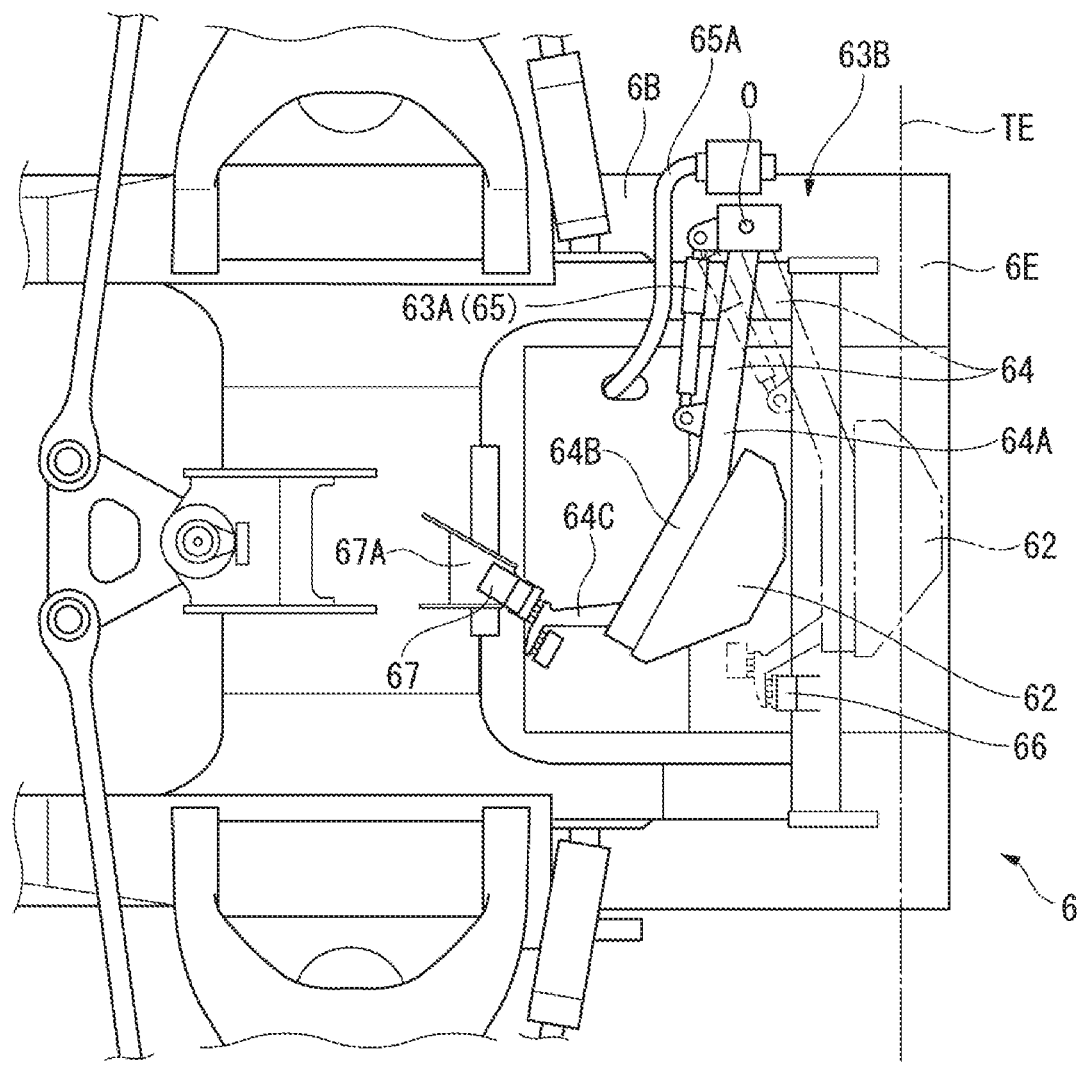
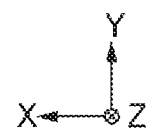

DUMP TRUCK

CROSS-REFERENCE TO RELATED APPLICATIONS

This application claims priority to International Application No. PCT/JP2018/026312, filed on Jul. 12, 2018, which claims priority to Japanese Application No. 2017-217265, filed on Nov. 10, 2017, the contents of which are incorporated herein in their entirety.

TECHNICAL FIELD

The present invention relates to a dump truck.

BACKGROUND ART

Various working vehicles (e.g. dump trucks and hydraulic excavators) work in civil engineering work sites and workings in mines. Among the working vehicles, dump trucks are designed to travel while being loaded with soil, sand and the like excavated by a hydraulic excavator and the like. In order to prevent collision during the travel, some of known dump trucks include an obstacle sensor (e.g. radar) at an end and a lateral side in a travel direction (see, for instance, Patent Literature 1).

It should be noted that such an obstacle sensor is desirably capable of detecting objects (referred to as "obstacle(s)" hereinafter) present in both of front and back directions in order to keep the dump truck from colliding with nearby obstacle when the dump truck travels in the front and back directions.

Patent Literature 1 discloses that a laser scanning radar is attached to a rotatable platform provided on a vehicle side surface of a dump truck, the platform being rotated in accordance with the travel direction of the dump truck to detect the obstacles in both of the front and back directions.

CITATION LIST

Patent Literature(s)

Patent Literature 1 JP 2015-230551 A

SUMMARY OF INVENTION

Problems to be Solved by the Invention

It is necessary for an obstacle sensor to be disposed at a position capable of keeping detection performance when a dump truck dumps soil and the like, and also capable of accurately detecting an obstacle and a shoulder of a travel road and keeping the detection performance when the dump truck does not dump soil and the like (e.g. when the dump truck travels in a dumping direction). It is also necessary for the obstacle sensor to be disposed at a position without erroneously detecting the dump truck itself as an obstacle irrespective of whether the dump truck is dumping soil and the like. In order to keep the detection performance of the obstacle sensor, it is also necessary for the obstacle sensor to be disposed at a position without interfering a structure (e.g. a car stop) present in the dumping direction to prevent damage on the obstacle sensor while the dump truck dumps the soil and the like.

An object of the invention is to provide a dump truck capable of ensuring a sufficient detection range for an obstacle in a dumping direction of the dump truck, and accurately detecting the obstacle and keeping detection performance irrespective of whether the dump truck is dumping soil and the like.

Means for Solving the Problem(s)

A dump truck according to an aspect of the invention is configured to travel in travel directions and dump loads in a dumping direction collinear to one of the travel directions, the dump truck including:
a chassis including tires provided at front and rear parts of the chassis in the travel directions;
an obstacle detector provided at a dump-side end of the chassis, the obstacle detector detecting an obstacle in the dumping direction of the chassis; and
a shifter that is capable of moving the obstacle detector to a first position, at which the obstacle detector protrudes from a dump-side end of the tires, and to a second position at an inner side with respect to the dump-side end of the tires.

BRIEF DESCRIPTION OF DRAWING(S)

FIG. 6 is an exploded perspective view showing the structures of the obstacle detector and the shifter according to the first exemplary embodiment.

FIG. 12 is a bottom plan view showing the structures of the obstacle detector, the shifter, and the storage mechanism according to the second exemplary embodiment.

DESCRIPTION OF EMBODIMENT(S)

Exemplary embodiment(s) of the invention will be described below with reference to the attached drawings.

1. Description of Overall Arrangement of Dump Truck 1

Figure 1:
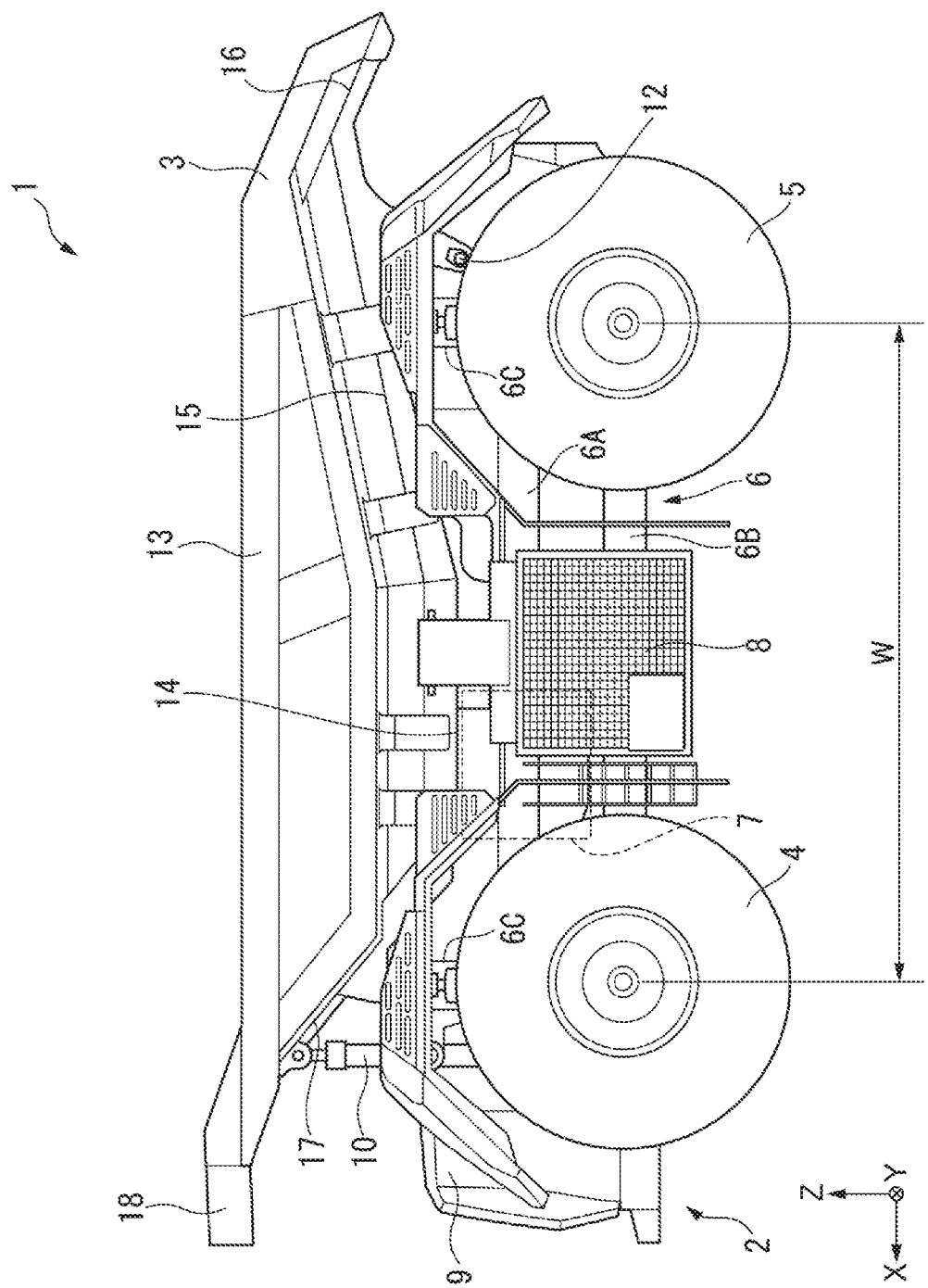
FIG. 1 is a side elevational view showing a dump truck according to a first exemplary embodiment of the invention.
Figure 2:
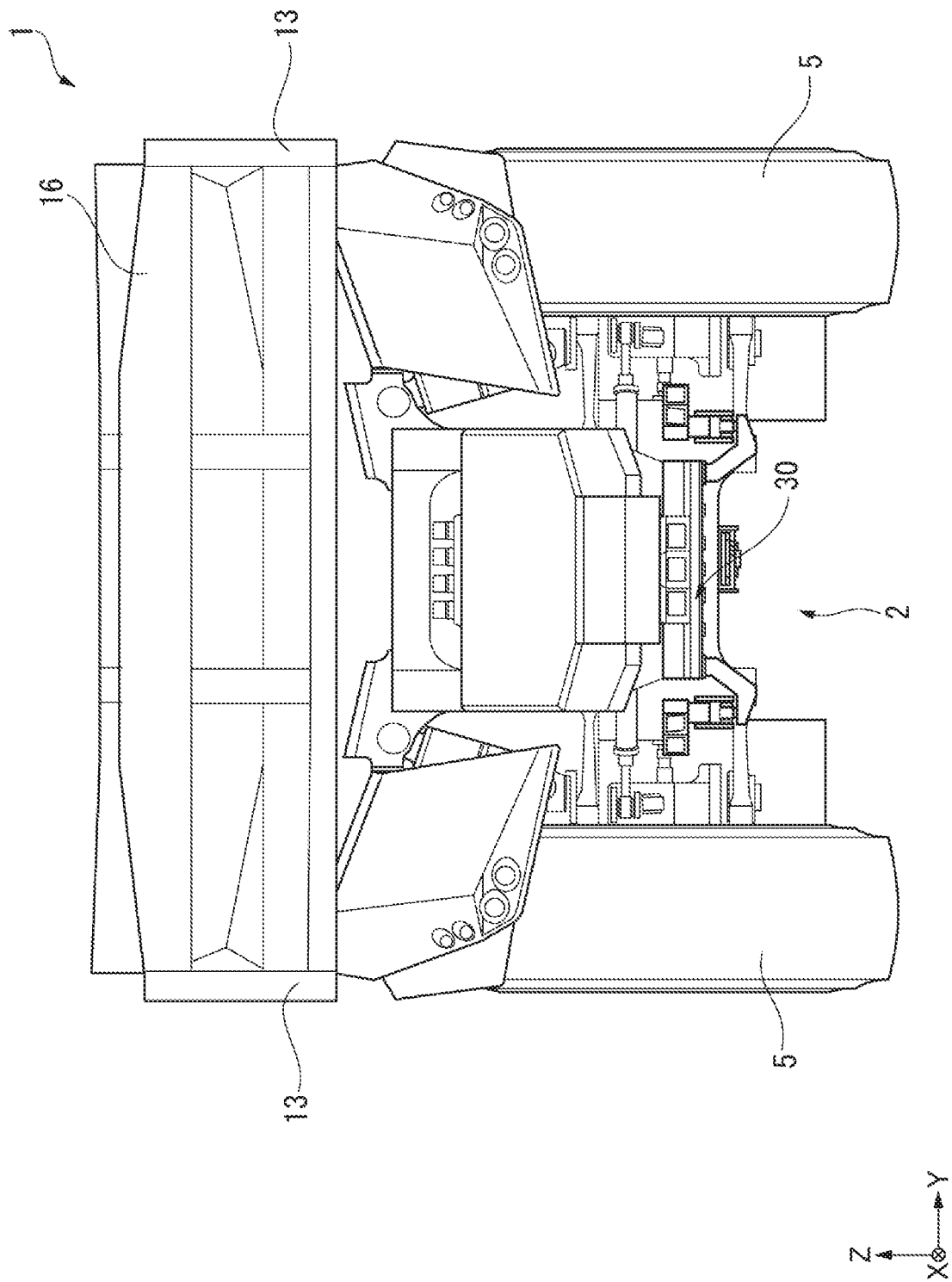
FIG. 2 is a rear elevational view showing the dump truck according to the first exemplary embodiment.

FIGS. 1 and 2 show a dump truck 1 according to a first exemplary embodiment of the invention. FIG. 1 is a side elevational view showing the dump truck 1 viewed in a vehicle-width direction orthogonal to a travel direction. FIG. 2 is a rear elevational view showing a dump side of the dump truck 1 viewed in the travel direction.

It should be noted that X axis, Y axis and Z axis in the exemplary embodiment shown in each of the figures are orthogonal with one another. Further, the travel direction, the vehicle-width direction and a vertical direction are defined as follows for the convenience of description in the exemplary embodiments. Specifically, with reference to FIG. 1, the travel direction of the dump truck 1 is represented by an arrow of the X axis (a first travel direction being defined as a direction indicated by the arrow of the X axis, a second travel direction being defined in the direction opposite thereto); the vehicle-width direction is represented by an arrow of the Y axis (a first vehicle-width direction being defined in the direction indicated by the arrow of the Y axis, a second vehicle-width direction being defined as the direction opposite thereto); and the vertical direction is represented by an arrow of the Z axis (a first vertical direction being defined as a direction indicated by the arrow of the Z axis, a second vertical direction being defined as a direction opposite thereto). It should also be noted that, since front, rear, right, and left sides of a chassis 2 and a dump body 3 each define a rectangle, the first travel direction is sometimes referred to as "front"; the second travel direction is sometimes referred to as "rear"; the first vehicle-width direction is sometimes referred to as "right"; and the second vehicle-width direction is sometimes referred to as "left" in the exemplary embodiments below for the convenience of description.

The dump truck 1 is configured to travel in both front and back directions and dump soil and the like in one direction. The dump truck 1 is a remotely controllable unattended off-road dump truck, which is, for instance, a vehicle operable at a digging site for developing mines. The remote control is conducted with full use of information and communication technologies such as communication units provided at a control center and the dump truck 1, and the Global Positioning System (GPS).

The dump truck 1 includes the chassis 2 and the dump body 3. The dump truck 1 is configured to travel in both front and rear directions with loads (e.g. soil and sand) being loaded in the dump body 3, and to dump the loads in a—X axis direction (the second travel direction in FIG. 1). It should be noted that "forward" travel herein means that, the vehicle (dump truck), which is not distinguishable in front and rear directions in terms of a travel operation, is capable of moving in the same manner (i.e. travelling forward) in both front and rear directions.

The chassis 2 is configured to travel by being supported by a pair of right and left tires 4, which are provided at a first side of the chassis 2 in the travel direction and arranged side by side in the vehicle-width direction, and a pair of tires 5, which are provided at the second side of the chassis 2 in the travel direction and arranged side by side in the vehicle-width direction. The chassis 2 includes a frame 6 elongated in the travel direction. Each of the tires 4, 5 at front and rear sides in the travel direction is attached to the frame 6 via a suspension.

The frame 6 includes a pair of upper side members 6A and a pair of lower side members 6B at both lateral sides of the chassis 2, the upper and lower side members 6A, 6B extending in the travel direction. Though not illustrated, each of the upper side members 6A and corresponding one of the lower side members 6B, which are vertically spaced apart from each other, are connected by a plurality of vertical members 6C at front and rear ends of the upper and lower side members 6A, 6B. The pair of upper side members 6A, which are spaced apart in the vehicle-width direction from each other, are mutually connected by a plurality of upper cross members extending in the vehicle-width direction. The pair of lower side members 6B are mutually connected by a plurality of lower cross members 6D (see FIG. 3) extending in the vehicle-width direction. In other words, the frame 6 forms a rectangular parallelepiped framework as seen in the travel direction of the chassis 2.

An engine 7, a radiator 8, a control device 9, a hoist cylinder 10, and a later-described obstacle sensor 30 (see FIG. 2) are mounted on the frame 6. It should be noted that the dump truck 1, which is a vehicle configured for unattended remote control, has no cab for a drive operation as provided in a typical dump truck.

The engine 7 is provided between the upper side members 6A and the lower side members 6B of the frame 6. An upper part of the engine 7 protrudes beyond the upper side members 6A.

The engine 7 is provided at a rear side of the tires 4 and disposed in a wheel base W defined by rotation centers of the tires 4 and the tires 5. The center of gravity of the dump truck 1 is located substantially at the center of the chassis 2.

The radiator 8, which is provided in a pair and arranged side by side substantially at the center of the chassis 2 in the vehicle-width direction, is configured to dissipate heat of coolant for the engine 7.

The control device 9 is configured to control the travel of the dump truck 1 based on sensor information sent from the obstacle sensor 30 (see FIG. 2) provided at a dump-side end of the chassis 2, a temperature sensor provided to the engine 7, rotation sensors provided to the tires 4, 5 and the like.

The hoist cylinder 10 is provided in a pair (two hoist cylinders) and arranged in the vehicle-width direction at a rear side of the control device 9. A proximal end of each of the hoist cylinders 10 is rotatably connected to the frame 6 and a distal end of each of the hoist cylinders 10 is rotatably connected to a lower side of an end of the dump body 3 opposite a dump end of the dump body 3.

The hoist cylinders 10 are operated by a hydraulic oil delivered from a hydraulic pump (not shown), which is provided in the frame 6 and driven by the engine 7.

Further, the tires 4, 5 are driven by an electric motor (not shown), which is housed in the lower cross member 6D (see FIG. 5) and driven by electric power supplied by a power generator (not shown) driven by the engine 7. In other words, the dump truck 1 is an all-wheel-drive dump truck.

2. Structure of Dump Body 3

The dump body 3 covers an entire length (i.e. a dimension in the travel direction) and an entire width (i.e. a dimension in the vehicle-width direction) of the chassis 2 in a plan view. The dump end of the dump body 3 extends rearward beyond the end of the chassis 2. The dump body 3 is in a form of a rectangular box in the plan view. It should be noted that the form of the dump body 3 and the form of the chassis 2, which are both rectangular, are not distinguishable in the front-back direction. Accordingly, the dump truck is capable of travelling forward in both directions (described as forward or rear travel for the convenience of description). Further, though not illustrated, the dump body 3 is mounted on a body mount provided at an upper end of the vertical member 6C.

The body mount, which is provided on an upper side of the frame 6, supports the load of the dump body 3.

The frame 6 has an end in the travel direction, i.e. a dump end, where the dump body 3 is attached via a hinge 12 in a manner capable of being raised or lowered (i.e. tiltable). The dump body 3 is raised or lowered around the hinge 12 on the frame 6 by an extension and retraction of the above-described hoist cylinders 10.

As shown in FIGS. 1 and 2, the dump body 3, which is in the form of the rectangular box in a plan view, includes a pair of side plates 13, a bottom 14, a first inclined portion 15, a second inclined portion 16, and a front portion 17. The first inclined portion 15 rises upward from a rear portion of the bottom 14. The second inclined portion 16 inclines downward from an upper end of the first inclined portion 15. The front portion 17 rises upward from a front portion of the bottom 14. A projection 18 is provided at an upper end of the front portion 17.

4. Structure of Obstacle Sensor 30

As shown in FIG. 2, the obstacle sensor 30 (obstacle detector) is provided at a rear side of the dump truck 1 (specifically, at a lower side of the dump end).

Figure 3:
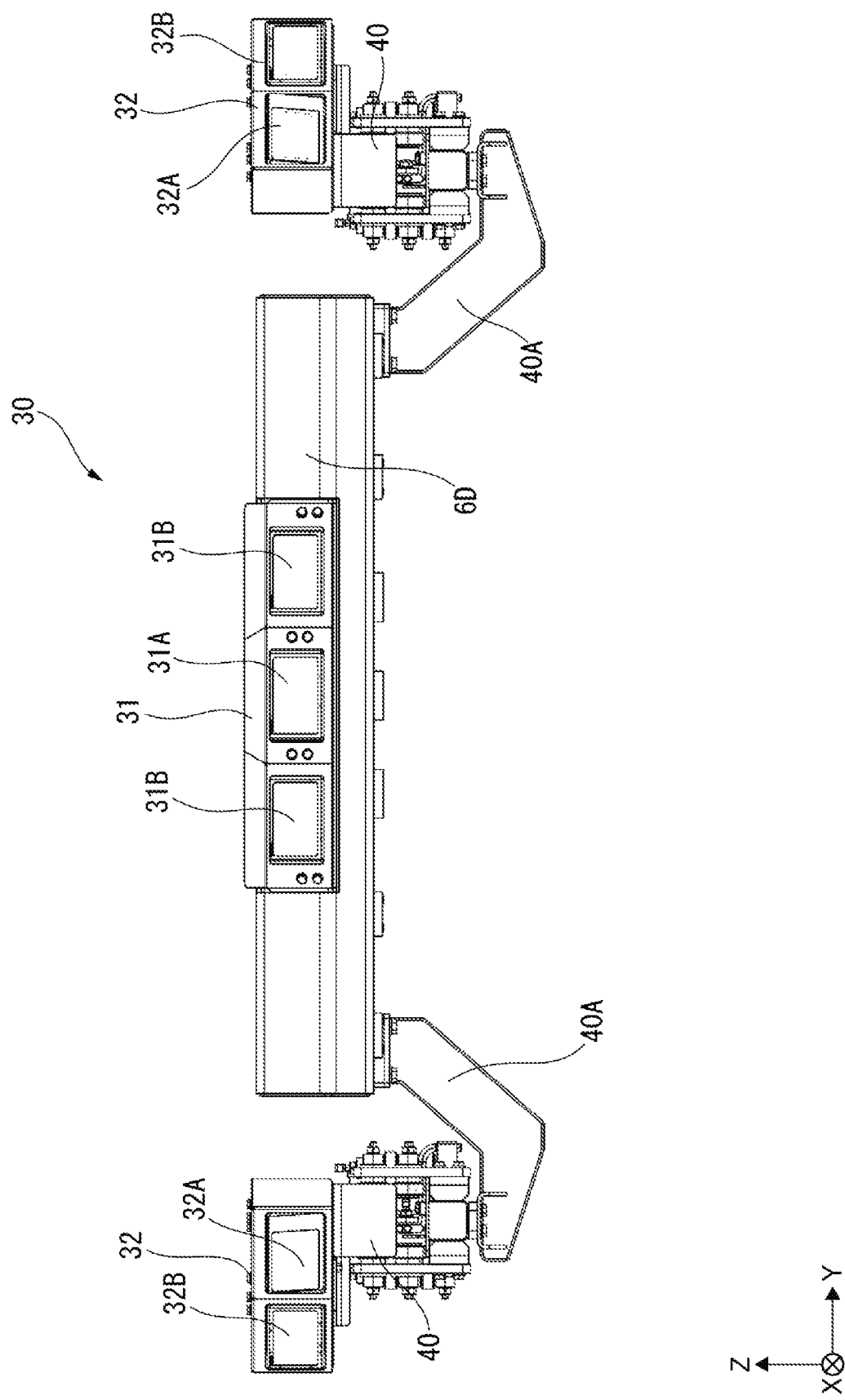
FIG. 3 is a rear elevational view showing a structure of an obstacle detector according to the first exemplary embodiment.

As shown in FIG. 3, the obstacle sensor 30 includes a first sensor unit 31 and second sensor units 32.

The first sensor unit 31 is, as shown in FIG. 3, provided at the center of the dump truck 1 in the vehicle-width direction, and is fixed to corresponding one of the lower cross members 6D (sometimes referred to as the lower cross member 6D hereinafter) of the frame 6 of the dump truck 1.

As shown in FIG. 3, the first sensor unit 31 includes three millimeter-wave radars 31A, 31B arranged in the vehicle-width direction of the dump truck 1.

The millimeter-wave radars 31A, 31B, which are sensors configured to emit electric waves and detect the electric waves reflected by an obstacle to detect the obstacle, are adjusted for two ranges (a long-distance detection range and a middle-distance detection range) in the first exemplary embodiment.

Figure 4:
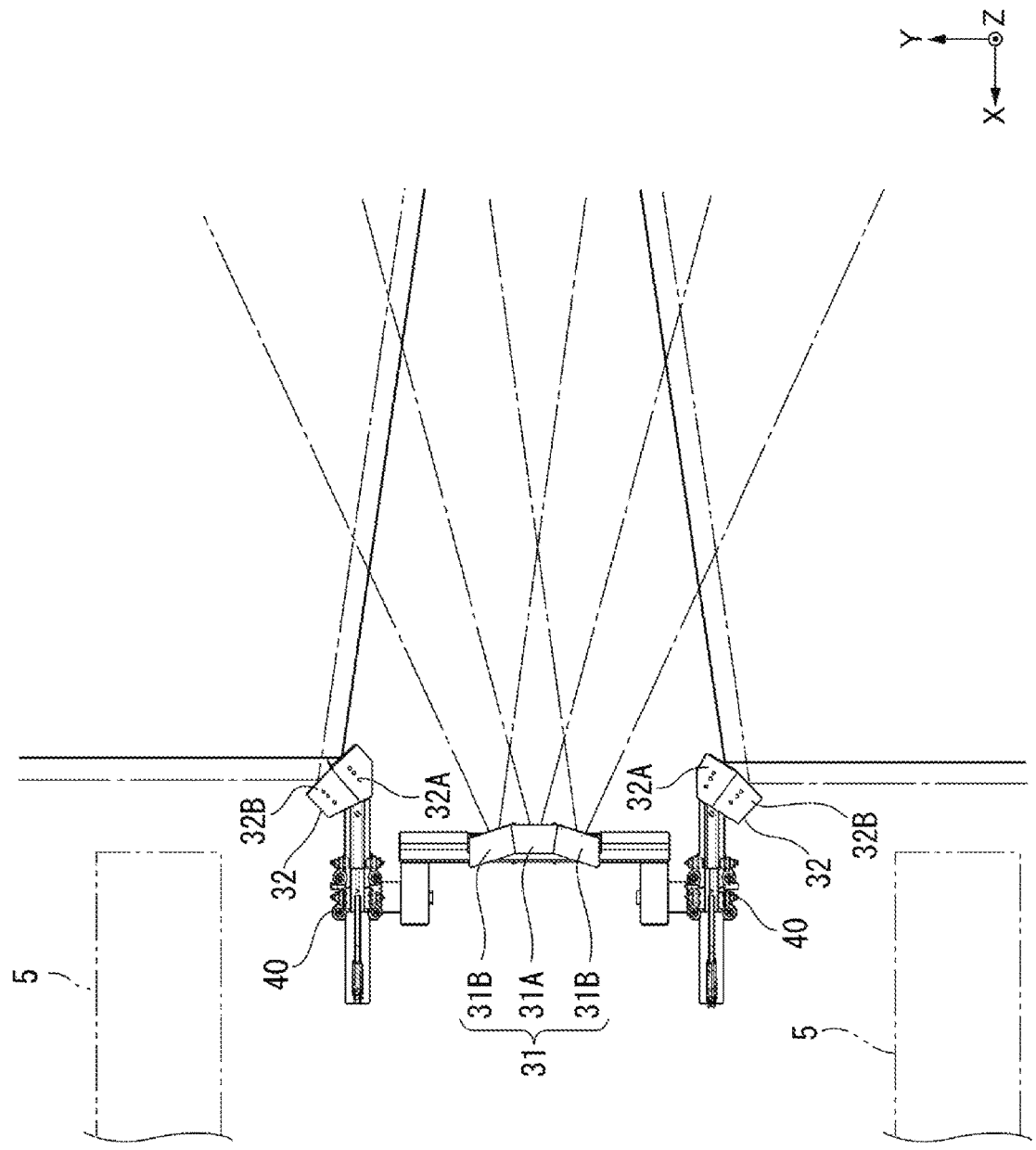
FIG. 4 is a plan view showing a detectable range of the obstacle detector according to the first exemplary embodiment.

As shown in FIG. 4, the millimeter-wave radar 31A at the center has a sensor whose detection surface faces in a dumping direction of the dump truck 1. The detectable range of the millimeter-wave radar 31A is set in a range defined by two dash-dotted lines extending from the detection surface of the sensor.

The pair of millimeter-wave radars 31B, which are adjacent to the millimeter-wave radar 31A, each have a sensor whose detection surface faces diagonally rearward with respect to the dumping direction of the dump truck 1. The detectable range of the millimeter-wave radar 31B is set in a range defined by two dash-dotted lines extending from the detection surface of the sensor.

The second sensor units 32, which are provided between the tires 5 in the vehicle-width direction of the dump truck 1, are each provided at corresponding one of ends of the lower cross member 6D in the vehicle-width direction (hereinafter sometimes referred to as "width ends") in a manner symmetrical with respect to the center in the vehicle-width direction. Though detailed later, the second sensor units 32 are each attached to a shifter 40 provided to each of the ends of the lower cross member 6D.

Each of the second sensor units 32 includes a laser scanning radar 32A and a millimeter-wave radar 32B.

The laser scanning radar 32A is a sensor configured to emit a laser beam and detect the beam reflected by an obstacle, thus being capable of detecting a light-reflecting obstacle. As shown in FIG. 4, while the laser scanning radar 32A protrudes rearward from the dump-side end of the tires 5 by the shifter 40, the detectable range of the laser scanning radar 32A is defined by two solid lines starting from a laser-beam-receiving surface. The detectable range of the laser scanning radar 32A ranges from an end of the tires 5 in the dumping direction to corresponding right or left side, thereby detecting an obstacle and road shoulder within the range.

The laser scanning radar 32A is capable of detecting objects within a range from a lateral side at the rear of the corresponding one of right and left tires 5 to a rear side of the dump-side end of the corresponding one of the tires 5. Accordingly, the laser scanning radar 32A is capable of detecting not only an obstacle but also a road shoulder of a travel road and a centerline position of the travel road. Thus, the laser scanning radar 32A serves as a lane-keeping sensor for driverless travel of the dump truck 1.

The millimeter-wave radar 32B, which is the same as that used for the first sensor unit 31, has a sensor whose detection surface faces diagonally rearward with respect to the dumping direction of the dump truck 1.

The detectable range of the millimeter-wave radar 32B is set in a range defined by two dash-dotted lines extending from the detection surface of the sensor. The detectable range of the millimeter-wave radar 32B is partially overlapped with the detectable ranges of the millimeter-wave radars 31A, 31B of the first sensor unit 31.

As shown in FIG. 4, the detectable ranges of the millimeter-wave radars 31A, 31B and the millimeter-wave radar 32B in total cover ranges at the rear of the dump truck 1 extending 90 degrees in each of right and left directions (from the dumping direction to the vehicle-width direction of the dump truck 1) in a plan view, so that an obstacle present within the detectable ranges is detectable. Thus, the use of the millimeter-wave radars 31A, 31B, and the millimeter-wave radar 32B allows wide-range detection of an obstacle.

It should be noted that, though the sensor used in the first exemplary embodiment uses electric waves or laser, a CCD camera or CMOS sensor may alternatively be used for the detection of an obstacle and a road shoulder in the invention.

5. Structure of Shifter 40

As shown in FIG. 3, the shifter 40 is attached to a lower side of the lower cross member 6D via an arm 40A.

Figure 5:
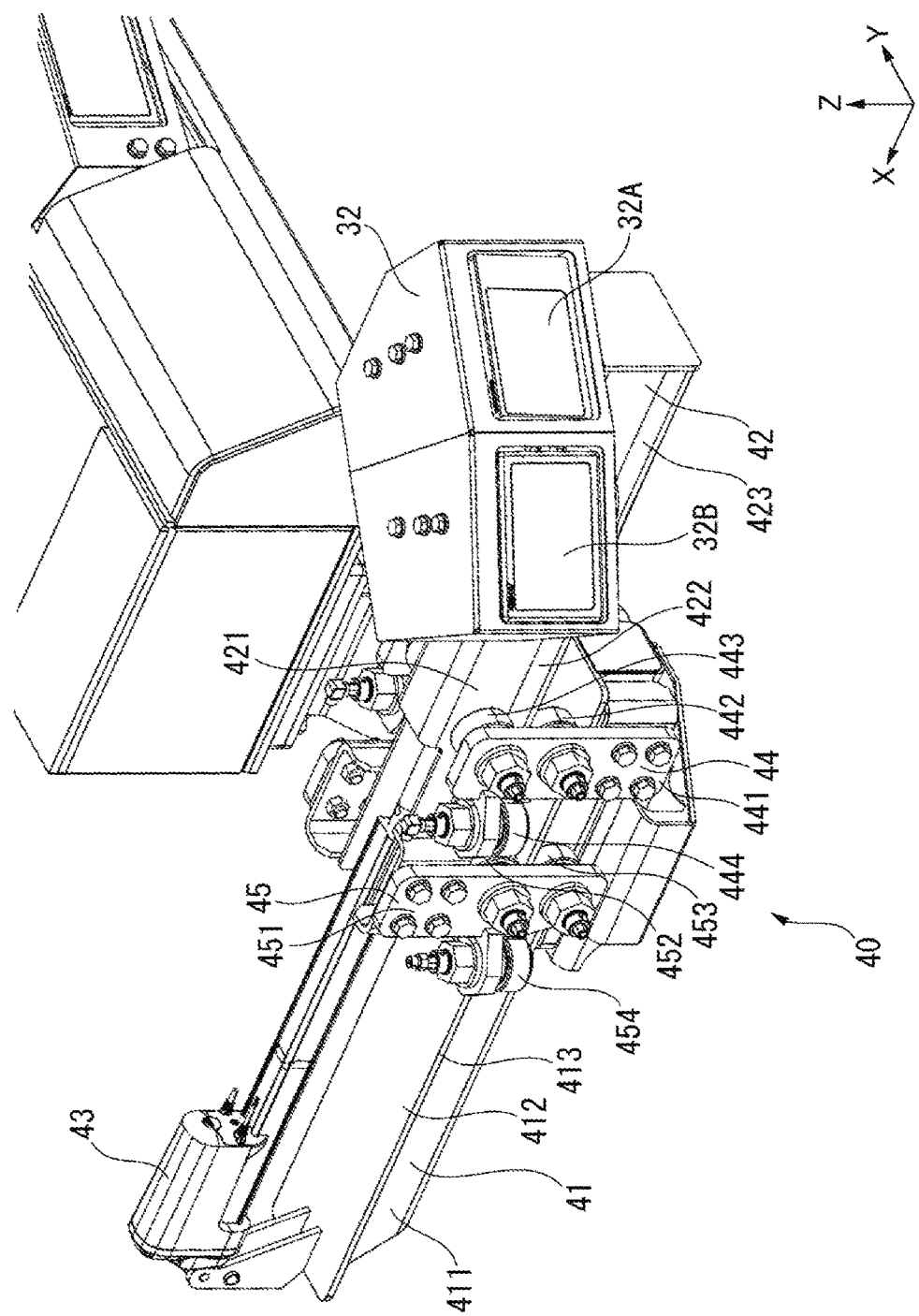
FIG. 5 is a perspective view showing the structure of the obstacle detector and a structure of a shifter according to the first exemplary embodiment.
Figure 7:
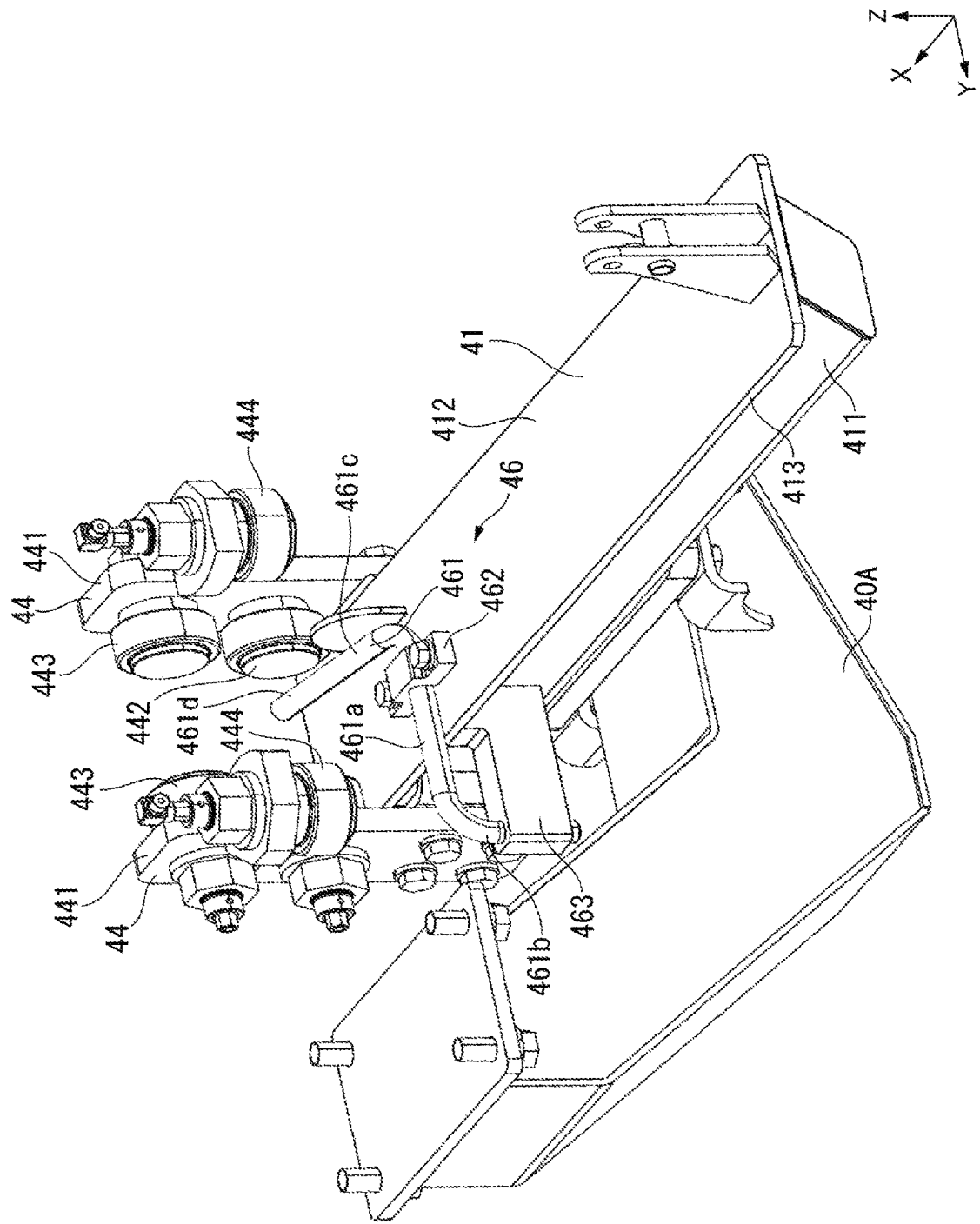
FIG. 7 is a perspective view showing the structure of the shifter according to the first exemplary embodiment.

A specific structure of the shifter 40 is shown in FIGS. 5 to 7, in which FIG. 5 is a perspective view with the second sensor unit 32 being attached, and FIGS. 6 and 7 are exploded perspective views. It should be noted that FIGS. 5 to 7 show the shifter 40 attached to the left side with respect to the center in the vehicle-width direction when the dump truck 1 is viewed in the dumping direction. The shifter 40 attached to the right side with respect to the center in the vehicle-width direction, which has substantially the same structure, will not be described herein.

The shifter 40 is configured to move the second sensor unit 32 to a first position, at which the second sensor unit 32 protrudes from the dump-side ends of the tires 4, and to a second position at an inner (front) side with respect to the dump-side end of the tires 4.

The shifter 40 is configured to move the second sensor unit 32 on a rail between the first and second positions. As shown in FIG. 5, the shifter 40 includes a stationary rail 41, a movable rail 42, an electric actuator 43, a stationary-rail engagement portion 44, a movable-rail engagement portion 45, and a biasing unit 46 (see FIG. 7).

The stationary rail 41 (first rail), which has a substantially trapezoidal cross section as shown in FIGS. 5 and 6, includes a rail body 411 in a form of a steel box with an open upper side, and a steel plate 412 covering the open upper side of the box of the rail body 411. Width ends of the plate 412 protrude from width ends of the rail body 411 to form a flange 413.

The movable rail 42 (second rail), which has a rectangular cross section, includes a rail body 421 in a form of a steel box with an open lower side, and a steel plate 422 covering the open side of the rail body 421. Width ends of the plate 422 protrude from width ends of the rail body 421 to form flanges 423.

An electric actuator 43 is provided at a front side of an upper surface of the stationary rail 41. The electric actuator 43 is configured to be electrically driven to move a piston forward and backward, thereby moving the movable rail 42 between the first position and the second position. It should be noted that the drive source, which is the electric actuator 43 in the first exemplary embodiment, may alternatively be a hydraulic actuator using hydraulic pressure in a hydraulic circuit of the dump truck 1.

The stationary rail 41 and the movable rail 42 are disposed such that their faces provided with the flanges 413, 423 face each other. The stationary-rail engagement portion 44 and the movable-rail engagement portion 45 each serve as a gap retainer for holding the stationary rail 41 and the movable rail 42, respectively, with a predetermined gap.

The stationary-rail engagement portion 44, which is fixed on the stationary rail 41, restricts the movement of the movable rail 42 in up-and-down and right-and-left directions.

The stationary-rail engagement portion 44 includes base plates 441, lower rollers 442, upper rollers 443, and side rollers 444.

The base plates 441 are a pair of steel plate components sandwiching the stationary rail 41 from right and left sides thereof. A lower part of each of the base plates 411 is bolted to a corresponding side of the rail body 411 of the stationary rail 41.

The lower rollers 442 and the upper rollers 443, which are attached to respective inner sides of the base plates 441 in a manner rotatable around an axis parallel to the width direction of the stationary rail 41, are configured to hold upper and lower sides of the flange of the movable rail 42.

The side rollers 444, which are each attached through a bracket to a corresponding one of the base plates 441 in a manner rotatable around a perpendicular axis, are configured to hold both sides of the flanges of the movable rail 42 in the width direction.

The movable-rail engagement portion 45, whose arrangement is similar to the stationary-rail engagement portion 44, includes base plates 451, upper rollers 452, lower rollers 453, and side rollers 454.

The base plates 451 are a pair of steel plate components sandwiching the movable rail 42 from right and left sides thereof. A lower part of each of the base plates 451 is bolted to a corresponding side of the rail body 421 of the movable rail 42.

The upper rollers 452 and the lower rollers 453, which are attached to inner sides of the base plates 451 in a manner rotatable around an axis parallel to the width direction of the movable rail 42, are configured to hold upper and lower sides of the flanges of the stationary rail 41.

The side rollers 454, which are each attached through a bracket to a corresponding one of the base plates 451 in a manner rotatable around a perpendicular axis, are configured to hold both sides of the flange of the stationary rail 41 in the width direction.

FIG. 7 is a perspective view showing the structure of the shifter 40 as viewed from a front side. As shown in FIG. 7, the biasing unit 46 is provided on an upper side of the plate 412 of the stationary rail 41 at the rear of the stationary-rail engagement portion 44. The biasing unit 46, which is a component configured to bias the lower side of the movable rail 42 upon rearward protrusion of the movable rail 42, includes a torsion bar 461, a first bar-fixing unit 462, and a second bar-fixing unit 463.

The torsion bar 461 is a solid steel stick-shaped component bent in a form of a crank. A central portion 461a of the crank, which is located on the upper side of the plate 412 of the stationary rail 41, is inserted into the first bar-fixing unit 462 and is restricted from moving on the plate 412.

A first end 461b of the crank is bent downward in a normal direction of the plate 412 to be inserted into and fixed at the second bar-fixing unit 463 attached to a side surface of the rail body 411 of the stationary rail 41.

A second end 461c of the crank, which is bent in an L-shape similar to the first end, is bent diagonally upward to go gradually away from the surface of the plate 412 toward the tip thereof.

When, after the movable rail 42 is attached to the stationary rail 41, the electric actuator 43 is driven to protrude the movable rail 42 rearward, a diagonally uplifted distal end 461d of the torsion bar 461 biases the movable rail 42 from the lower side of the movable rail 42 (i.e. in a direction to be away from the stationary rail 41). The biasing force at this time pushes the lower side of the movable rail 42 upward at a predetermined force irrespective of an increase in the protrusion. Specifically, when the movable rail 42 protrudes rearward to be brought into contact with the torsion bar 461, a downward force is applied on the distal end 461d of the torsion bar 461. In response, an elastic force (biasing force) for restoring the original shape is generated in the torsion bar 461, thus upwardly biasing the movable rail 42 from the lower side.

Accordingly, when the movable rail 42 protrudes rearward, the biasing force for upwardly pushing the lower side of the biasing unit 46 is applied to the movable rail 42. Thus, even when the movable rail 42 protrudes rearward and vibrations and the like from the tires 4 act on the second sensor unit 32, shaky movement can be kept from being caused, allowing stable detection of an obstacle.

It should be noted that, though the vertically arranged stationary rail 41 and movable rail 42 are moved in the first exemplary embodiment, the scope of the invention is not limited thereto. For instance, the stationary rail may alternatively be in a form of an inner cylinder and the movable rail may be in a form of an outer cylinder receiving the stationary rail therein, where the second sensor unit 32 is attached to the movable rail so that the second sensor unit 32 is movable between the first and second positions.

6. Structure of Movement Controller 50

The above-described shifter 40 is driven in response to instructions of the movement controller 50 of a controller 9A in the external control device 9.

Figure 8:
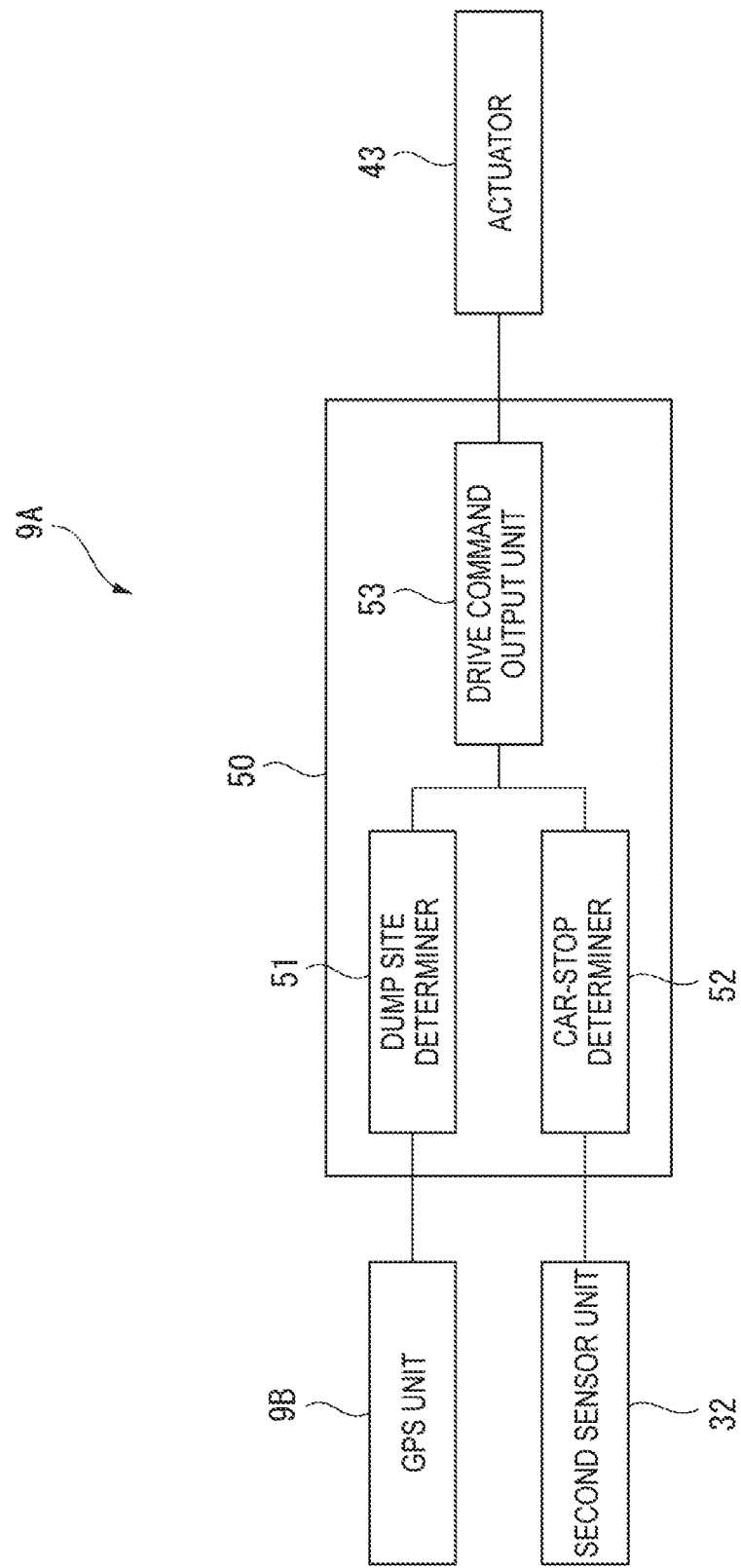
FIG. 8 is a block diagram showing a structure of a movement controller according to the first exemplary embodiment.

As shown in FIG. 8, the controller 9A of the control device 9 includes the movement controller 50. The movement controller 50 includes a dump site determiner 51, a car-stop determiner 52, and a drive command output unit 53.

The dump site determiner 51 is configured to determine whether the dump truck 1 is located at a dump site (e.g. mine), at which the loads are to be dumped, based on latitude and longitude information of the current position of the dump truck 1 acquired by a GPS unit 9B (position-information retriever), and map information stored in a storage (not shown). It should be noted that the GPS unit 9B, which serves as the position-information retriever for acquiring the latitude and longitude information of the dump truck 1, is configured to receive electric waves from a plurality of GPS satellites with a GPS antenna.

The car-stop determiner 52 is configured to detect the presence or absence of a car stop with the millimeter-wave radars 32B of the second sensor units 32 to determine whether the car stop is present nearby.

The drive command output unit 53 is configured to output to the electric actuator 43 a drive command for driving the second sensor unit 32 in a retracting direction when the dump site determiner 51 determines that the dump truck 1 is located at the dump site or the car-stop determiner 52 determines that there is a car stop around the dump truck 1.

When the dump site determiner 51 determines that the dump truck 1 is not located at the dump site and the car-stop determiner 52 determines that there is no car stop around the dump truck 1, the drive command output unit 53 outputs to the electric actuator 43 a drive command for driving the second sensor unit 32 in a protruding direction. It should be noted that the right and left electric actuators 43 may be synchronously and simultaneously driven to achieve synchronous movement of the shifters 40, thereby synchronously protruding or retracting the right and left second sensor units 32. Alternatively, the right and left electric actuators 43 may be independently driven, where, when it is determined that a car stop is not present in the protruding direction of one of the second sensor units 32, the corresponding one of the electric actuators 43 is not driven and the other electric actuator 43 is solely driven to retract the corresponding second sensor unit 32 only.

7. Advantage(s) of Exemplary Embodiment

The above-described first exemplary embodiment offers the following advantage(s).

Figure 9:
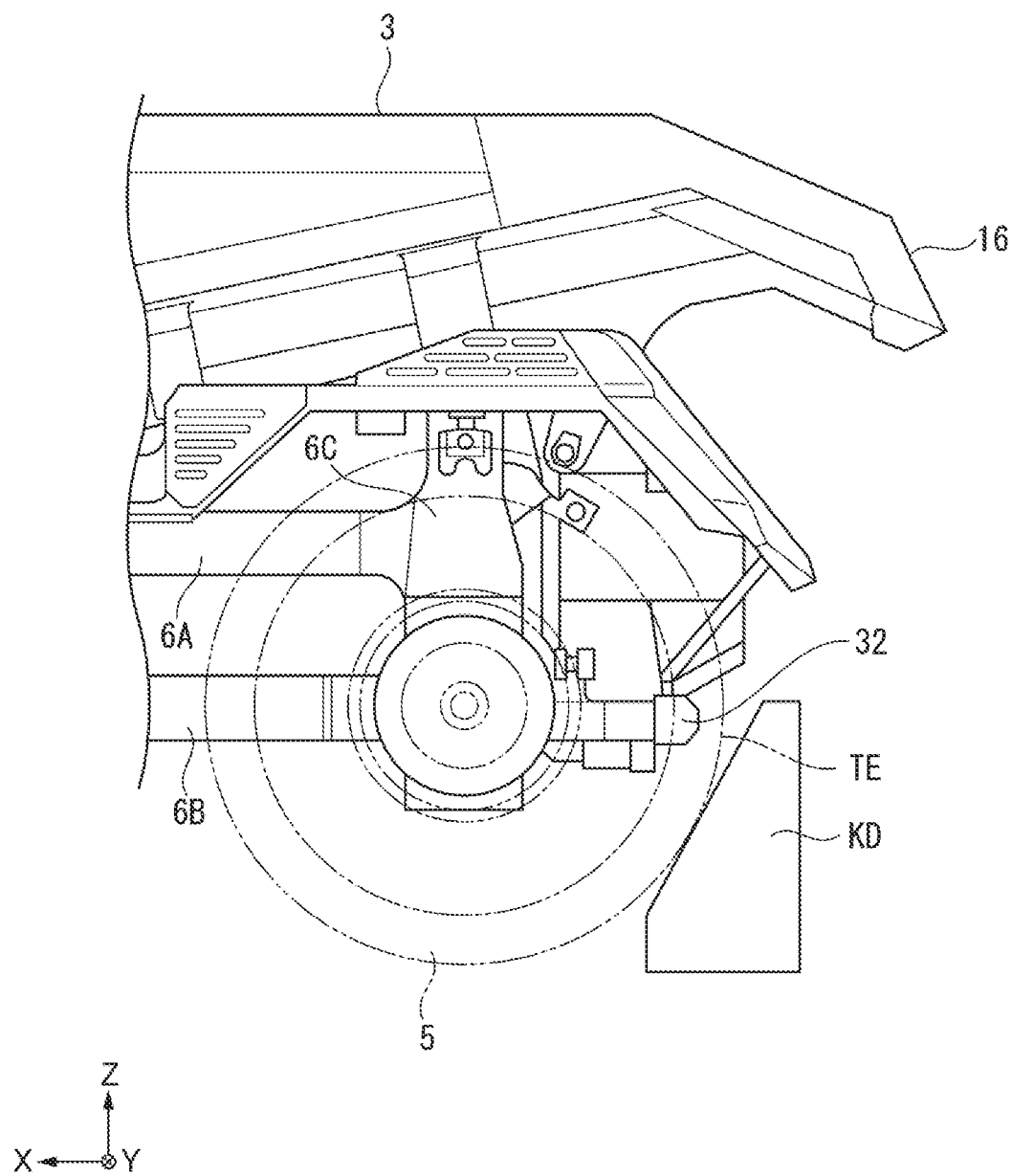
FIG. 9 is a side elevational view showing a function of the first exemplary embodiment.

The shifter 40 allows the second sensor unit 32 to be retracted to an inner side of the tires 5 (i.e. at a front side with respect to dump-side ends TE of the tires 5) as shown in FIG. 9. Accordingly, when the dump truck 1 dumps soil and the like, the second sensor unit 32 can be retracted before the dump-side ends TE of the tires 5 touch a car stop KD, thus preventing a damage of the second sensor unit 32.

Further, when the dump truck 1 travels in the dumping direction, the second sensor unit 32 may be protruded beyond the dump-side ends TE of the tires 5, thereby allowing wide-range detection of an obstacle and shoulder of road with the plurality of millimeter-wave radars 31A, 31B, 32B, and the plurality of laser scanning radars 32A. Accordingly, the detection accuracy of an obstacle can be ensured with the wide view field, and detection performance can be maintained.

The shifter 40, which can linearly move the second sensor unit 32 in the front-back direction of the dump truck 1, can keep the detectable range of the second sensor unit 32 unchanged even during the retraction of the second sensor unit 32, thereby maintaining the detection performance for an obstacle.

The movement controller 50 of the dump truck 1 commands the drive of the shifter 40 based on the current position information and detection of a car stop, so that the damage on the second sensor unit 32 can be prevented without being taken care of by an operator, who is at a remote site in the first exemplary embodiment, of the dump truck 1.

Since the shifter 40 includes the electric actuator 43 for driving the movable rail 42, the size of the shifter 40 can be easily reduced and the second sensor unit 32 can be retracted in a small space.

8. Second Exemplary Embodiment

Next, a second exemplary embodiment of the invention will be described. It should be noted that the same parts as already described will be denoted by the same reference characters hereinbelow to omit the description thereof.

In the above-described first exemplary embodiment, the second sensor unit 32 is translated by the shifter 40 to be movable between the first position protruded beyond the dump-side ends of the tires 5 and the second position at the inner side with respect to the tires 5.

Figure 10:
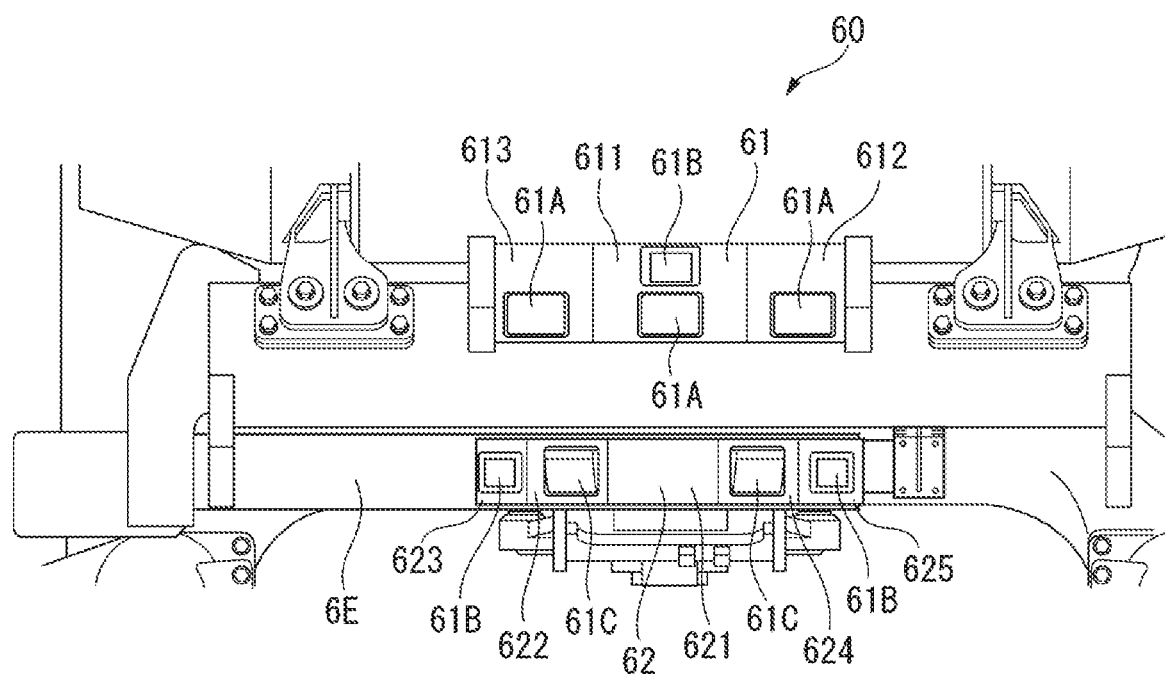
FIG. 10 is a rear elevational view showing a structure of an obstacle detector according to a second exemplary embodiment of the invention.

In contrast, as shown in FIG. 10, an obstacle sensor 60 of the second exemplary embodiment is provided at a lower rear side of the dump truck 1. The obstacle sensor 60 includes a first sensor unit 61 and a second sensor unit 62.

The first sensor unit 61 is provided and fixed on a bumper 6E fixed on the frame 6.

The first sensor unit 61 includes a side surface 611 extending along the vehicle-width direction, a side surface 612 whose normal direction is in a right rear direction, and a side surface 613 whose normal direction is in a left rear direction, the side surfaces being provided by a polygonal part of the rear side of the chassis 2. A millimeter-wave radar 61A for detecting a remote obstacle is provided to each of the side surfaces 611, 612, and 613. A short range radar 61B for detecting a closer obstacle is further provided on the side surface 611 extending along the vehicle-width direction.

The second sensor unit 62 provided with a plurality of sensors is movably provided on a lower side of the frame 6. The second sensor unit 62 is provided at the rear side of the chassis 2 and is in a polygonal form in a bottom plan (i.e. as viewed in—Z-axis direction). The second sensor unit 62 includes a width-direction side surface 621 extending along the vehicle-width direction, a side surface 622 whose normal direction is in rear left direction at a first angle with respect to the width-direction side surface 621, a side surface 623 whose normal direction is in a rear left direction at a second angle with respect to the width-direction side surface 621, a side surface 624 whose normal direction is in a rear right direction angled at the first angle with respect to the width-direction side surface 621, and a side surface 625 whose normal direction is in a rear right direction angled at the second angle with respect to the width-direction side surface 621.

A laser scanning radar 61C for detecting a remote obstacle is provided to each of the side surfaces 622, 624 angled at the first angle with respect to the width-direction side surface 621. The short range radar 61B for detecting a closer obstacle is provided on the side surfaces 623, 625 angled at the second angle with respect to the width-direction side surface 621.

Figure 11:
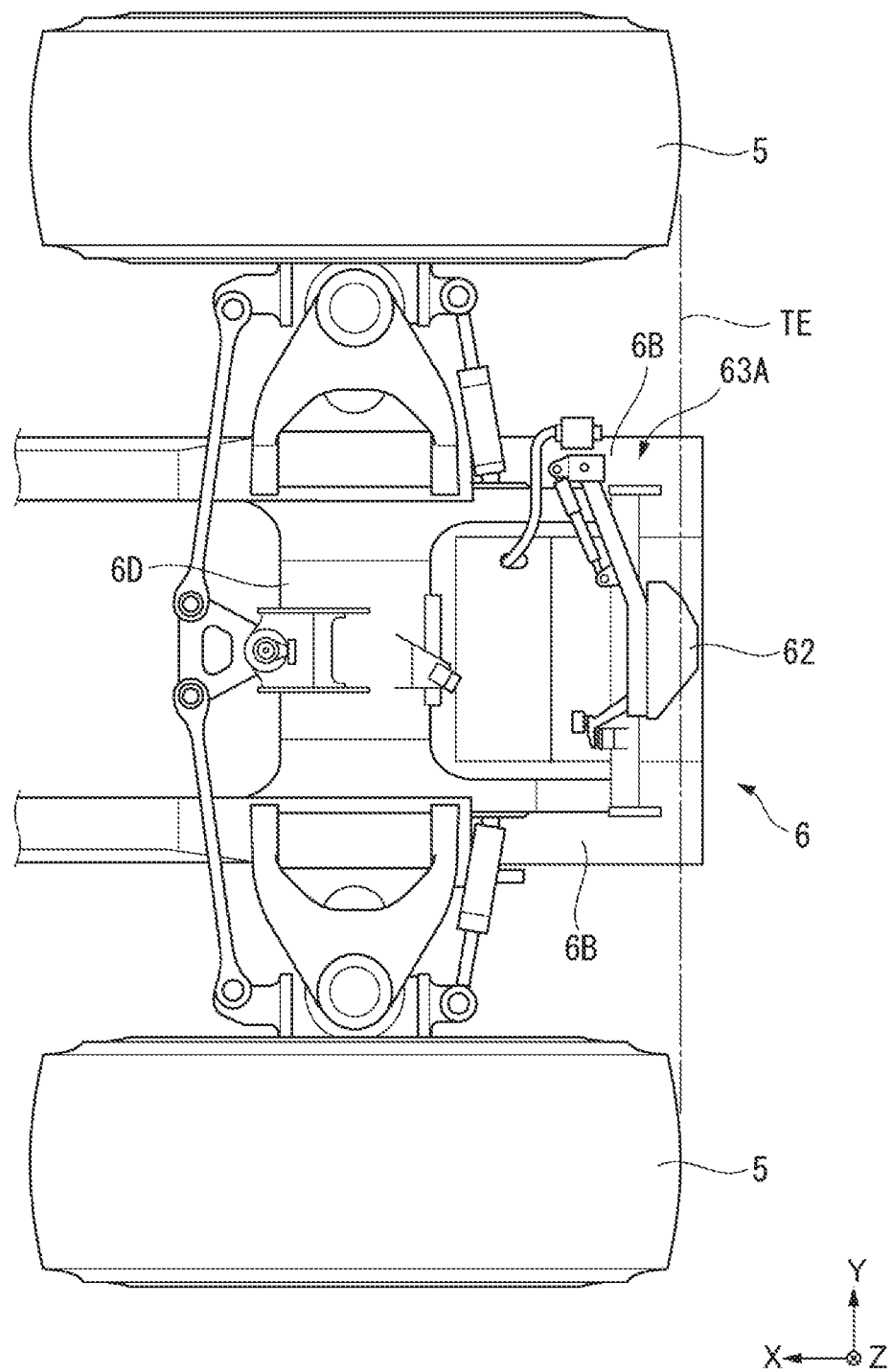
FIG. 11 is a bottom plan view showing the structure of the obstacle detector and structures of a shifter and a storage mechanism according to the second exemplary embodiment.

As shown in FIG. 11, the second sensor unit 62 is provided on the lower side of the frame 6 in a manner movable by the shifter 63A.

The second sensor unit 62 is configured to protrude rearward with respect to the dump-side ends TE of the tires 5 while the dump truck 1 travels, thus being capable of accurately detecting the obstacle at the rear of the chassis 2.

Accordingly, when the tires 5 are to be brought into contact with a car stop or the like in dumping the loads (e.g. soil and sand), the second sensor unit 62 may first touch the car stop to be damaged.

Figure 13:
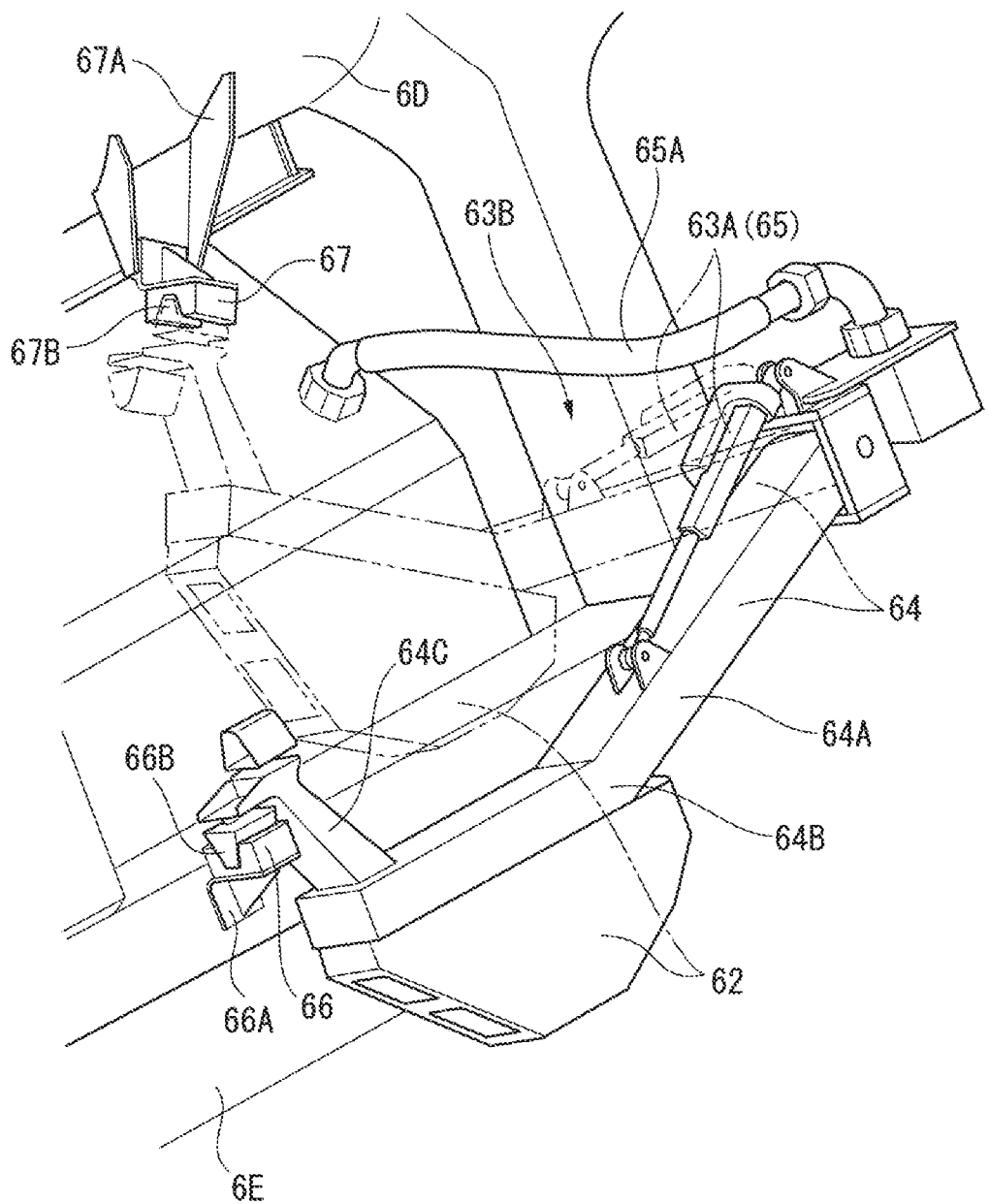
FIG. 13 is a perspective view showing the structures of the obstacle detector, the shifter, and the storage mechanism according to the second exemplary embodiment.

In view of the above, in the second exemplary embodiment, the shifter 63A is configured to rotate a storage mechanism 63B so that the second sensor unit 62 is movable to the inner side of the frame 6 (i.e. toward the front side with respect to the dump-side ends TE of the tires 5) when the loads (e.g. soil and sand) are dumped, as shown in FIGS. 12 and 13.

The storage mechanism 63B includes an arm 64, a first stopper 66, and a second stopper 67.

The arm 64, which is a rectangular steel pipe whose central portion is bent, includes a base end 64A attached to corresponding one of the lower side members 6B of the frame 6 in the vehicle-width direction, a bent portion 64B bent at an end of the base end 64A, and an engaging portion 64C diagonally protruding from an end of the bent portion 64B toward the front side.

The base end 64A is rotatably attached to a rotation point O, which is offset from an end of the frame 6, of the lower side member 6B.

The bent portion 64B is bent at an obtuse angle with respect to the base end 64A. As shown in FIG. 12, the bent portion 64B is configured to locate the second sensor unit 62 at a position to be aligned with the vehicle-width direction when the second sensor unit 62 protrudes toward the rear side.

The engaging portion 64C protrudes from the end of the bent portion 64B at an obtuse angle to be engageable with the first stopper 66 and the second stopper 67.

An actuator 65 (shifter 63A) has a base end rotatably attached to the lower side member 6B and a distal end rotatably connected to the end of the base end 64A of the arm 64.

The actuator 65 is a rack-and-pinion actuator for driving an electric motor (not shown) housed therein. Power to the electric motor is supplied through a cable 65A. When the electric motor is driven, the pinion is rotated to extend and retract the rack and, consequently, the actuator 65, in accordance with which the arm 64 is rotated. It should be noted that the actuator, which is in a form of an electric motor in the second exemplary embodiment, may alternatively be a hydraulic cylinder supplied with hydraulic oil of the dump truck 1 as in the first exemplary embodiment.

As shown in FIG. 13, the first stopper 66, which is provided near a terminal end of the rotation of the arm 64 in a direction for protruding the second sensor unit 62 beyond the tires 5, is attached to a lower side of the bumper 6E via a bracket 66A. The first stopper 66 is a steel piece component. A concave portion 66B of a V-shaped cross section is provided at the center of a side of the first stopper 66. Though not shown, a rubber sheet is attached to an inner surface of the concave portion 66B.

The second stopper 67, which is provided near another terminal end of the rotation of the arm 64 in a direction for retracting the second sensor unit 62 to the front side beyond the tires 5, is attached to the lower cross member 6D of the frame 6 via a bracket 67A. As in the first stopper 66, the second stopper 67 is also provided with a concave portion 67B of a V-shaped cross section and a rubber sheet is attached to an inner surface of the concave portion 67B.

At the terminal ends of the rotation, the biasing force caused by the extension or retraction of the actuator 65 acts on the first stopper 66 and the second stopper 67 arranged as described above. The rotation of the arm 64 is restricted by a repulsive force of the rubber on the inner surface of the concave portion 67B.

The second sensor unit 62, which is cantilevered while the arm 64 is rotated, is supported at the two ends by the engagement of the engaging portion 64C with the first stopper 66 (when the second sensor unit 62 is protruded) or the second stopper 67 (when the second sensor unit 62 is completely retracted), thus being firmly fixed to the frame 6.

Figure 14:
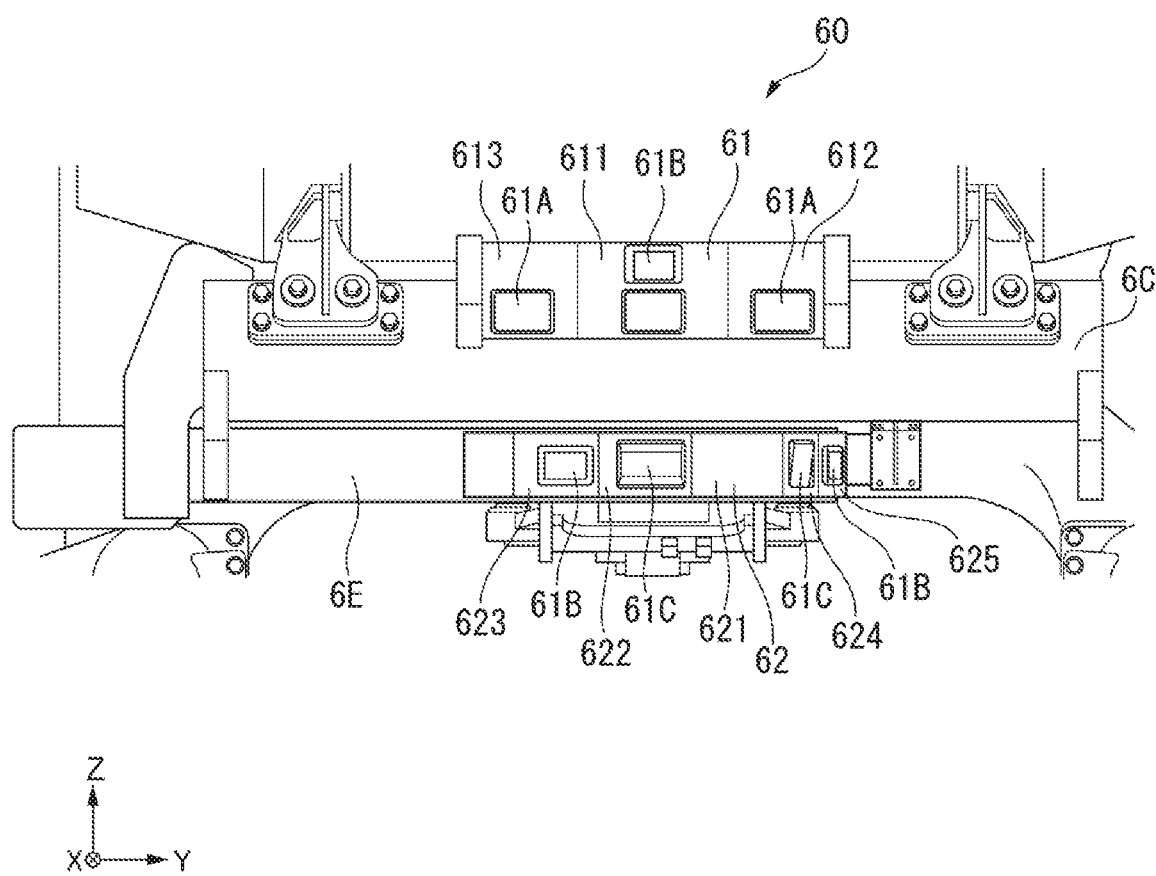
FIG. 14 is a rear elevational view showing the obstacle detector that has been retracted according to the second exemplary embodiment.

While the second sensor unit 62 is retracted in the frame 6 by the shifter 63A and the storage mechanism 63B, as shown in FIG. 14, the short range radar 61B and the laser scanning radar 61C at the right, which face a side of one of the tires 5, is thus unusable, but the short range radar 61B and the laser scanning radar 61C at the left, which face an area at the back of the chassis 2, can detect a remote obstacle, and a nearby obstacle.

The above-described second exemplary embodiment offers the following advantage(s) in addition to the advantage(s) of the above first exemplary embodiment.

Since the shifter 63A includes the actuator 65 and the storage mechanism 63B includes the arm 64, the first stopper 66, and the second stopper 67, the size of the shifter 63A can be easily reduced and the second sensor unit 62 can be retracted into a small space.

The second sensor unit 62, which is polygonal in a plan view, includes the short range radars 61B, and the laser scanning radars 61C on the plurality of sides of the polygon. Accordingly, even while the second sensor unit 62 is retracted, the obstacle(s) at the rear of the chassis 2 can be detected by the short range radar 61B and the laser scanning radar 61C facing the area at the back of the chassis 2, so that collision with an obstacle can be reliably avoided.

9. Third Exemplary Embodiment

In the above-described second exemplary embodiment, the storage mechanism 63B rotates the second sensor unit 62 around the rotation point O to retract the second sensor unit 62 to the front side beyond the dump-side ends TE of the tires 5.

Figure 15:
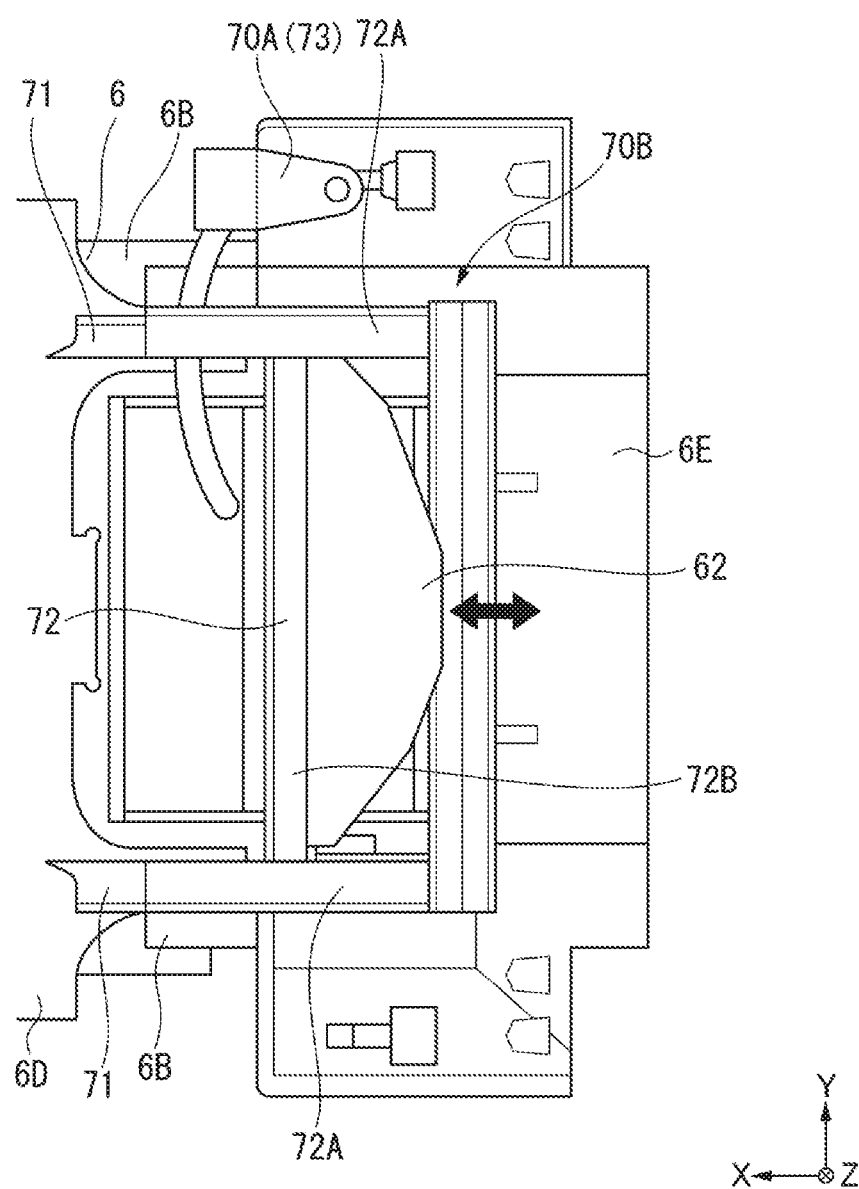
FIG. 15 is a bottom plan view showing an obstacle detector and a shifter according to a third exemplary embodiment of the invention.

FIG. 15 shows the second sensor unit 62 retracted to the front side beyond the dump-side ends TE of the tires 5 by the shifter 70A and the storage mechanism 70B according to a third exemplary embodiment. The third exemplary embodiment is different from the second exemplary embodiment in that, as shown in FIG. 15, a shifter 70A and a storage mechanism 70B are configured to linearly move the second sensor unit 62 along the frame 6 in the travel direction to protrude the second sensor unit 62 rearward beyond the dump-side ends TE of the tires 5 or retract the second sensor unit 62 to the front side beyond the dump-side ends TE of the tires 5.

The shifter 70A includes an actuator 73. The storage mechanism 70B includes rails 71 provided on the lower side members 6B of the frame 6, and a support 72 slidably engaged with the rails 71 to support the second sensor unit 62.

The pair of rails 71 are each fixed to a lower side of corresponding one of the pair of lower side members 6B disposed to face each other in the vehicle-width direction.

The support 72 includes a pair of engaging portions 72A each engaged with corresponding one of the pair of rails 71, and a bridge 72B extending between the pair of engaging portions 72A, the second sensor unit 62 being attached on the bridge 72B.

The actuator 73, which is an electric-motor-driven actuator as in the second exemplary embodiment, includes a proximal end fixed to the lower side of one of the lower side members 6B, and a distal end fixed to the support 72. When the actuator 73 is driven, the distal end of the actuator 73 extends or retracts, in accordance with which the support 72 slides on the rails 71.

The above-described third exemplary embodiment offers the same function(s) and advantage(s) as those mentioned in the above exemplary embodiments. Especially, in the third exemplary embodiment, since the second sensor unit 62 linearly moves as in the first exemplary embodiment when the second sensor unit 62 is to be retracted or protruded while the dump truck dumps the loads or travels on a road, the second sensor unit 62 can keep the detection performance for an obstacle while being moved.

10. Modifications

It should be understood that the scope of the invention is not limited to the above-described exemplary embodiment, but includes modification(s) and improvement(s) as long as an object of the invention can be achieved.

For instance, though the second sensor unit 62, which is retracted by: horizontally rotating the arm 64 with the shifter 63A and the storage mechanism 63B in the second exemplary embodiment; or sliding the support 72 on the rails 71 with the shifter 70A and the storage mechanism 70B in the third exemplary embodiment, the scope of the invention is not limited to such an arrangement.

Figure 16:
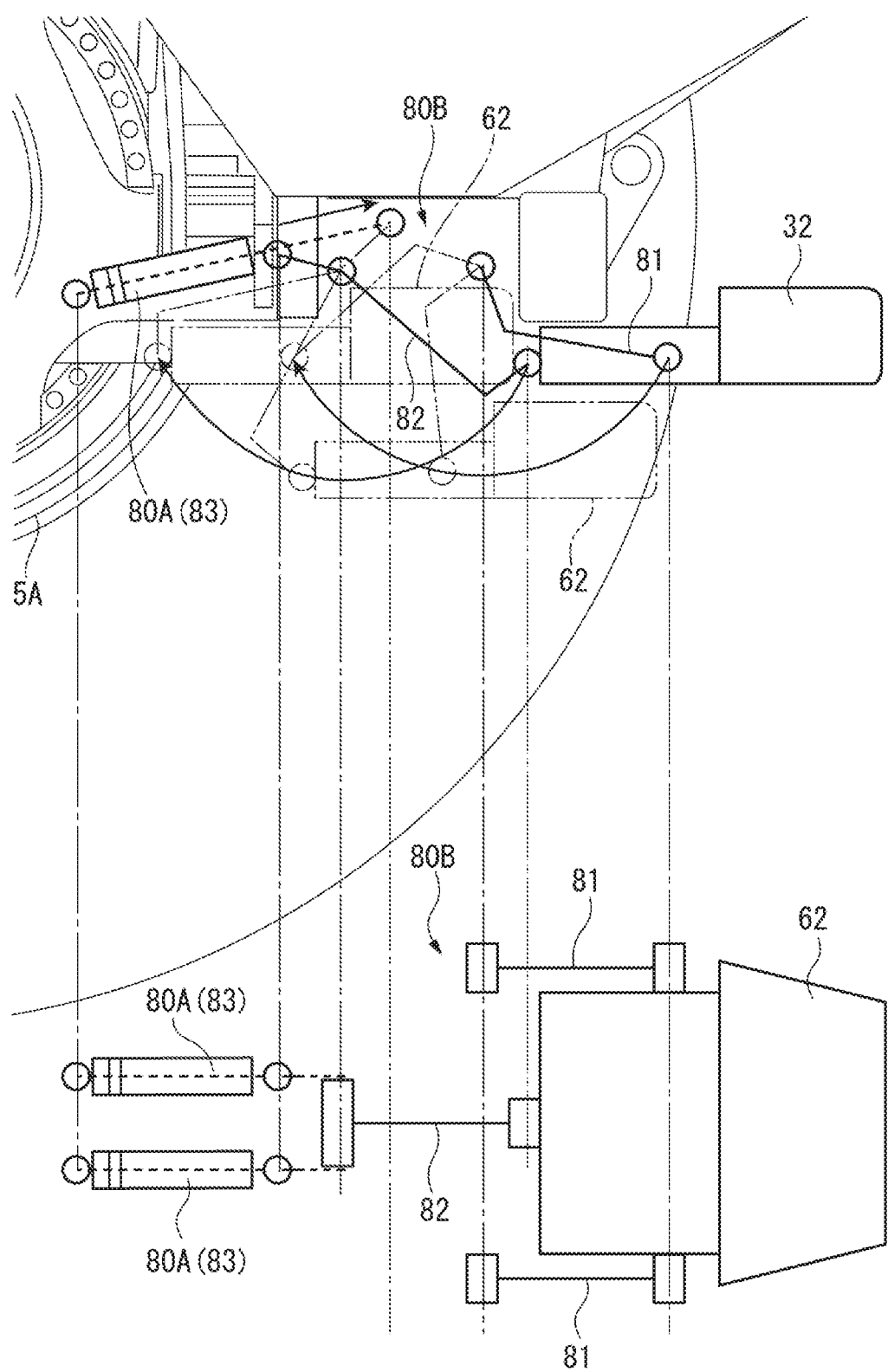
FIG. 16 is a schematic illustration showing an obstacle detector and a shifter according to a modification of the exemplary embodiment(s).

Specifically, as schematically shown in FIG. 16, a shifter 80A and a storage mechanism 80B, in which a side of the second sensor unit 62 is supported by an arm 81 that is rotatable around a horizontal axis, a tension member 82 is attached to a front end of the second sensor unit 62, and an actuator 83 is extended or retracted to retract the second sensor unit 32, are used in some embodiments.

In the obstacle sensor, though the second sensor unit is solely retracted by the shifter and the storage mechanism in the first to third exemplary embodiments, the obstacle sensors are integrated with the second sensor unit and configured to be retracted together by the shifter in some embodiments.

Other specific structure, shape and the like in implementing the invention may be altered in any manner as long as an object of the invention can be achieved.

The invention claimed is:

1. A dump truck that is configured to travel in travel directions and dump loads in a dumping direction collinear to one of the travel directions, the dump truck comprising:
   a chassis comprising tires provided at front and rear parts of the chassis in the travel directions;
   an obstacle detector provided at a dump-side of the chassis, the obstacle detector being configured to sense an obstacle in the dumping direction of the chassis; and
   a shifter that is configured to move the obstacle detector (i) to a first position protruding in the dumping direction relative to a dump-side end of the tires and (ii) to a second position retracted in a direction opposite to the dumping direction relative to the dump-side end of the tires.

2. The dump truck according to claim 1, wherein the shifter comprises shifters each provided to corresponding one of vehicle-width ends of the chassis, the shifters being configured to be synchronously driven.

3. The dump truck according to claim 2, wherein the shifters each comprise:
   a first rail provided to the one of the vehicle-width ends of the chassis, the first rail extending in the travel directions;
   a second rail configured to move along the first rail, the second rail being provided with the obstacle detector; and
   an actuator configured to move the second rail along the first rail.

4. The dump truck according to claim 3, wherein each of the shifters comprises:
   a gap retainer that holds the second rail and defines a predetermined gap between the second rail and the first rail; and
   a biasing unit that biases the second rail in a direction away from the first rail.

5. The dump truck according to claim 1, wherein the obstacle detector is configured to, based on being disposed at the first position, sense the obstacle located in a 90-degree range from the dumping direction to a vehicle-width direction.

6. The dump truck according to claim 1, wherein the shifter is configured to be driven in response to a command from an external movement controller.

7. The dump truck according to claim 6, further comprising:
   a position-information retriever configured to acquire current-position information of the dump truck,
   wherein the external movement controller is configured to command a drive of the shifter based on the current-position information of the dump truck acquired by the position-information retriever.

8. The dump truck according to claim 7, wherein the external movement controller is configured to command the drive of the shifter based on determining that the dump truck is located at a dump site.

9. The dump truck according to claim 6, wherein the external movement controller is configured to command a drive of the shifter based on the obstacle detector detecting a car stop.

10. The dump truck according to claim 1, wherein the shifter comprises a rail configured to guide movement of the obstacle detector between the first position and the second position.

11. The dump truck according to claim 1, wherein the obstacle detector comprises a pair of obstacle detectors disposed at vehicle-width ends of the chassis, respectively, and spaced apart from each other in a vehicle-width direction, and
   wherein the shifter comprises a pair of shifters disposed at the vehicle-width ends of the chassis and configured to guide movement of the pair of obstacle detectors, respectively.

12. The dump truck according to claim 11, further comprising a cross bar that extends in the vehicle-width direction and connects the pair of shifters to each other.

13. The dump truck according to claim 12, wherein each of the pair of shifters comprises an arm connected to one of ends of the cross bar.

14. The dump truck according to claim 11, wherein the pair of shifters are configured to simultaneously move the pair of obstacle detectors between the first position and the second position.

* * * * *